United States Patent Office 2,999,022
Patented Sept. 5, 1961

2,999,022
LIQUID SHORTENING METHOD
Emory T. Payne and Robert A. Seybert, Sherman, Tex., assignors to Anderson, Clayton & Co., Houston, Tex., a corporation of Delaware
No Drawing. Filed Mar. 26, 1957, Ser. No. 648,494
8 Claims. (Cl. 99—118)

The present invention relates to liquid shortening methods of manufacture.

An ideal liquid shortening is a stable suspension of solid discrete particles of fats in oil in a temperature range of from about 60° to about 110° F. The suspension should remain fluid throughout this temperature range without any significant change in viscosity or without separation or settling of the solid fraction. It is also necessary that a true liquid shortening should be fluid at normal room temperatures of 70° to 80° F. even after exposure to extreme temperatures of as low as 40° F. and as high as 110° F. These are rigid requirements and it is exceedingly difficult to prepare a liquid shortening which will meet them.

It is a major object of this invention to provide a process of preparing such a liquid shortening which meets the above-mentioned requirements, that is, a liquid shortening comprised of a stable suspension of solid discrete particles of fats in oil in a temperature range of from about 60° to about 110° F. which remains fluid throughout this range without any significant change in viscosity or without separation or settling of the solid fraction even though exposed to extreme temperatures as low as about 40° F. and as high as about 110° F.

It is known that glyceride fats may be crystallized in any one of a number of forms which depends on the temperature and speed at which crystallization is permitted to take place. The three general classifications of crystalline forms of fats in the art are the alpha crystalline form, the beta crystalline form and the beta-prime crystalline form.

As is well-known in the art, the alpha crystalline form is the least stable, lowest melting and least dense of the forms. The beta crystalline form is generally the most stable, most dense and highest melting of the polymorphic forms for any hard fats. The beta-prime crystalline form is intermediate between the alpha and beta crystalline forms in stability, melting point and density.

Liquid shortenings having the most desirable properties have their glyceride fats, or a predominant portion thereof, in beta crystalline form. The more stable beta crystals, however, do not guarantee a heat-stable suspension within the range of temperatures and for the length of time ordinarily encountered in storage and transportation of commercial shortenings.

The present invention is based on the discovery that by carefully controlling the crystal nuclei from which the beta crystals are formed, a large number of small beta-prime crystals are formed. When these beta-prime crystals are converted to beta crystals by the process of the present invention, the same number and size of beta crystals are formed as were present in the beta-prime form. This results in a large number of small stable beta crystals suspended in oil which meets the very rigid requirements of a truly heat-stable liquid shortening.

Accordingly, it is a further object of this invention to provide a method of making a liquid shortening in which the suspended solid fats are predominantly small or non-settling beta crystals.

A further object of this invention is the provision of a process of preparing a heat-stable liquid shortening in which small beta-prime crystals are formed as a nuclei for the beta crystals, and the formation of the beta crystals is controlled so that substantially the same number and size of beta crystals are formed as the beta-prime crystal nuclei.

It is yet a further object of this invention to provide a method of preparing a liquid shortening which may be colored or flavored or both and which meets the very rigid requirements of a truly heat-stable liquid shortening.

It is yet a further object of this invention to provide an improved flavoring agent or combination for shortening which has a better carry through into the finished cooked or baked product and which eliminates the tendency of the shortening to develop a rancid odor.

Other and further objects, features and advantages will be apparent from the following description of presently-preferred examples of the invention given for the purpose of disclosure.

In general, the process of the invention comprises heating oil containing solid fats to a temperature high enough to melt all solid material and crystal nuclei. No unmelted crystal nuclei should be left at this point as this would adversely affect the crystal growth necessary for a truly heat-stable liquid shortening. The liquid is then cooled to a temperature just above the alpha melting point of the fat and there held for a length of time for small beta-prime crystalline growth. The unstable beta-prime crystals are then converted into small stable beta crystals of substantially the same number and size as the beta-prime crystals by heating the shortening to a temperature a few degrees above the beta-prime melting point and maintaining this temperature for a short period of time. This causes some of the fats to melt and in order to recrystallize these fats in the same form and pattern already established, the shortening is cooled slowly to below the alpha melting point.

It has been found that proper agitation is essential for the formation of the desired type and size crystals. Too little, too vigorous or nonuniform agitation results in poor suspension stability. Uniform agitation at a rate of 0.11 to 0.22 horsepower per 100 lbs. of oil is satisfactory with a peripheral speed of the paddles to be between about 390 feet per minute and about 710 feet per minute.

The agitation should be continuous throughout the process until slowly cooled substantially below the alpha melting point. Agitation should then be stopped and the shortening packaged. If desired, however, the shortening may be allowed to temper in a quiescent state for a day or two days at this temperature and then agitated gently and packaged, although good results have been obtained by packaging the shortening immediately, as previously described.

The incorporation of any gas during the crystallization process results in poor suspension stability. The gas bubbles attach themselves to the crystals and significantly lower their density below that of the oil and thus rise to the surface of the oil. All gas must be excluded and this can be accomplished by chilling in a vacuum or by making certain that the crystallization vessel is completely filled.

It has further been found advantageous to include coloring and flavoring additives, and particularly advantageous to include an improved coloring and flavoring combination, later described.

The following examples illustrate presently-preferred processing conditions of the invention. All percentages given are by weight. The abbreviation I.V. stands for iodine value.

EXAMPLE I

The liquid shortening had the following composition: 2.7% 1.0–3.0 I.V. soybean oil, 4.8% superglycerinated fat made from 30 I.V. peanut oil, and 92.5% refined and bleached cottonseed oil. The analysis of this composition was as follows:

Analysis

| | |
|---|---|
| Iodine value | 101 |
| Cloud point, °C | 33.7 |
| Wiley melting point, °C | 45.1 |
| Percent monoglycerides | 2.44 |
| Alpha melting point, °C | 28.9 |
| Beta melting point, °C | 50.8 |
| Beta prime melting point, °C | 39.9 |

Dilatomertic solids at:

| | |
|---|---|
| 10° C | 6.3 |
| 21.1° C | 5.5 |
| 26.7° C | 5.0 |
| 33.3° C | 4.2 |
| 40° C | 2.9 |

The above-described oil was heated to 77° C. in pilot plant equipment with agitation of 0.15 horsepower per 100 lbs. of oil with a paddle peripheral speed of 550 feet per minute. This resulted in melting all solid material and crystal nuclei. The agitation was uniformly continued throughout the remainder of the process. While it is presently preferred that entire crystallization process be carried out in a vacuum vessel under 29 in Hg vacuum to prevent incorporation of any gas in this example, the vessel was completely filled and the material was not under a vacuum.

The shortening was then cooled with 20° C. cooling water from 77° C. to 32.5° C. in 15 to 25 minutes and held at this temperature for 30 minutes to promote growth of small beta-prime crystals. This is 3.6° C. above the alpha melting point. This resulted in the formation of beta-prime crystals of small size which served as the nuclei for the more stable beta crystals.

The beta-prime crystals were converted into the more stable beta crystals of the same size by heating the shortening with 50° C. water from 32.5° C. to 45° C. for fifteen minutes and maintaining it at this temperature for thirty minutes.

The crystals which were melted were recrystallized in the same pattern by cooling the shortening from 45° C. to 21° C. very gradually over a period of two hours. Agitation was then stopped and the shortening was tempered by allowing it to stand for forty-eight hours. The shortening was then agitated gently and then packaged.

The shortening prepared by the above process met the rigid requirements of a true heat-stable shortening.

In determining the alpha melting point capillary tubes filled with 1–2 cm. of fat were first thrust into a boiling water bath for 2–3 seconds, then immediately immersed in an ice bath, and then finally placed in a constant temperature bath observing whether or not melting occurred. The process was repeated regulating the constant temperature bath to a temperature which just begins to melt the fat in the final step. This temperature was the alpha melting or softening point.

In determining the beta melting point the same capillary tubes containing fat were used as in determining the alpha melting point. The tubes were tempered for four hours in a constant tempeature bath 1–2° C. below the alpha melting point. The capillary tubes were then tempered for fifteen to twenty hours in a constant temperature bath at 10° C. above the alpha melting point, and the melting point was determined by heating at a rate of 0.2° C. per minute.

The beta-prime melting point is midway between the alpha melting point and the beta melting point.

An X-ray analysis was made during the process of Example I. This analysis established that substantially all beta-prime crystals were present at the first low-temperature cycle of the process, that is, 32.5° C. and that these beta-prime crystals were transformed into beta crystals of the same size during the second heating of the process, that is, when heated to and held at 45° C. No detailed discussion of the X-ray analysis is deemed necessary. It should be mentioned, however, that the X-ray diffraction pattern is not made on the liquid shortening as a whole. The crystalline phase is separated from the emulsion and then subjected to X-ray analysis. This separation may be accomplished in any preferred manner, for example, by a centrifugal filter maintained at a constant temperature. Patent No. 2,521,242 granted September 5, 1950, on the application of Mitchell, illustrates alpha, beta and beta-prime crystalline forms.

In Example I, satisfactory results were obtained in cooling to just above the alpha melting point in 10 to 45 minutes and a satisfactory temperature above the alpha melting point was about 1.5 to 4.5° C. Also, satisfactory results were obtained by heating to above the beta-prime melting point in 10 to 20 minutes and satisfactory temperatures were 3.5 to 5.5° C. above the beta-prime melting point. The recrystallization may be accomplished by slowly cooling the shortening to 21° C. over a 1½ to 3-hour period.

Liquid shortenings with satisfactory suspension stabilities from 50° F. to 110° F. have been formulated from base oils including refined and bleached cottonseed oil, 100–105 I.V. cottonseed oil, cottonseed oil salad oil, refined and bleached soybean oil; and 105–115 I.V. soybean oil; hardstocks including hardened soybean oil (0–6 I.V.), hardened peanut oil (5–10 I.V.); and super-glycerinated fats including hardened peanut oil (5–30 I.V.), hardened cottonseed oil (5–24 I.V.), hardened mustard see oil (8–10 I.V.), hardened rapeseed oil (8–10 I.V.), and super-glycerinated fats composed of one-third 90–95 I.V. soybean oil and two-thirds 5–10 I.V. cottonseed oil, one-third 45 I.V. peanut oil and two-thirds I.V. peanut oil, and one-third unhardened cottonseed oil and two-thirds 5–10 I.V. peanut oil.

The following example illustrates the preparation of a colored liquid shortening having a butter-like flavor and meeting the rigid requirements of a temperature-stable liquid shortening.

EXAMPLE II

A 1,000 gram sample of deodorized oil composed of 92.3% unhardened cottonseed oil, 2.9% hardened soybean oil (1.5 I.V.) and 4.8% super-glycerinated hardened peanut oil (30 I.V.) containing 42% monoglyceride was heated to 77° C. to melt all crystals and crystal nuclei. This sample was processed in an open stainless steel laboratory size beaker (2,000 cc.) and was agitated with a laboratory size cenco stirrer.

The oil was then cooled to 65.5° C. and 5,000 units as vitamin A of synthetic beta carotene were added to color the oil yellow. The oil was then placed in a 32.2° C. water bath and cooled to approximately 49° C. and 36 p.p.m. of an acetoin (methyl acetyl carbinol) type imitation butter flavor added. One such satisfactory imitation butter flavor is Dodge & Olcott's Imitation Butter Concentrate No. 9012. Another satisfactory butter flavor is Davis & Company's Imitation Sweet Butter Oil—Extra Concentrate. The mixture was then further cooled to 32.5° C. and maintained at this temperature for thirty minutes to form small beta-prime crystals. The mixture was then heated in ten to twenty minutes to 4.50° C. in a 45.0° C. water bath and maintained at this temperature for thirty minutes to form beta crystals of the same size and number as the beta-prime crystals. The mixture was then slowly cooled to 21.1° C. for about two hours to recrystallize any melted crystals in the established crystalline pattern. Agitation was then stopped.

The colored-flavored liquid shortening had the following physical and chemical characteristics.

Lovibond color—35 yellow, 5.8 red
Flavor—like butter
Percent free fatty acid—.03
W.M.P., °C.—46.0

Dilatometric solids at:
- 10° C _____ 5.7
- 21.1° C _____ 5.1
- 26.7° C _____ 4.5
- 33.3° C _____ 3.6
- 40° C _____ 2.7

Percent monoglyceride _____ 2.12
Iodine value _____ 101.8
Physical characteristics:
- 15.6° C _____ Fluid and homogeneous
- 21.1° C _____ Do.
- 26.7° C _____ Do.
- 32.2° C _____ Do.
- 37.8° C _____ Do.

The acetoin flavoring agent may include small quantities of ethyl butyrate and diacetyl; however, ethyl butyrate or diacetyl as the predominant active ingredient is unsatisfactory. Any butter-flavoring or other flavoring, for example, lard flavoring, may be used, however, which imparts a desirable flavor to the liquid shortening and any coloring agent may be used.

While any desired coloring and flavoring agent or agents may be used in the shortening, the improved coloring and flavoring composition of the copending application of Ray B. Donohue and Richard J. Bell, Serial No. 648,522, now U.S. Patent 2,928,746, is particularly advantageous with the shortening of the present invention. This coloring and flavoring composition comprises beta carotene including a starter distillate reinforced with diacetyl and iso amyl acetate. The starter distillate reinforced with diacetyl is a recognized flavoring material listed in allowable flavoring materials for use in margarine. Starter distillates are made by culturing milk under proper sanitary and temperature conditions with bacterial cultures especially developed for the ripening of milk. This cultured milk is then distilled and a clear liquid distillate is obtained which contains diacetyl and other chemical compounds which produce a butter-like flavor and aroma. The addition of iso amyl acetate to this distillate (starter material) surprisingly gives a carry through or carryover of the flavor into the finished baked or cooked foods which is not accomplished without it. A satisfactory mixture is 55 p.p.m. of starter material and 20 p.p.m. of iso amyl acetate, the remainder beta carotene, although other proportions may be used. For example, 35 p.p.m. starter material and 5 p.p.m. iso amyl acetate, the remainder beta carotene is satisfactory. Preferably, this coloring and flavoring composition is added in liquid shortening as indicated in Example II. That is, after the crystals and crystal nuclei have initially been melted and cooled to a temperature just above the alpha melting point. The coloring and flavoring composition, however, may be added at any time desired.

This coloring and flavoring composition, as well as others, may be added to Example I and to the following-described Examples III–VIII, inclusive, to give a butter-like flavor and color to the liquid shortening with remarkable carry through characteristics to the finished baked or cooked product.

EXAMPLE III

The liquid shortening had the following composition: 2.8% hardened soybean oil (1–2 I.V.), 4.8% superglycerinated hardened peanut oil (30 I.V.), and 92.4% winterized cottonseed oil (salad oil).

The analysis of this composition was as follows:

Iodine value _____ 103.3
Dilatometric solids at:
- 10.0° C _____ 5.6
- 21.1° C _____ 5.1
- 26.7° C _____ 4.5
- 33.3° C _____ 3.7
- 40.0° C _____ 2.8

One hundred eighty-five pounds of oil where heated to 77° C. in pilot plant equipment with agitation of 0.15 horsepower for 100 pounds of oil with a paddle peripheral speed of 550 feet per minute. This resulted in melting all solid material and crystal nuclei. The agitation was uniformly continued throughout the remainder of the process and the entire crystallization process was carried out in a vessel completely filled to prevent incorporation of any gas. The shortening was then cooled with 20° C. cooling water from 77° C. to 32.5° C. in 15 to 25 minutes and held at this temperature for 30 minutes to promote growth of small beta-prime crystals. This is 3.6° C. above the alpha melting point. This resulted in the formation of beta-prime crystals of small size which served as the nuclei for the more stable beta crystals.

The beta-prime crystals were converted into the more stable beta crystals of the same size by heating the shortening with 50° C. water from 32.5° C. to 45° C. in fifteen minutes and maintaining it at this temperature for thirty minutes.

The crystals which were melted were recrystallized in the same pattern by cooling the shortening from 45° C. to 21° C. very gradually over a period of two hours. Agitation was then stopped and the shortening was tempered by allowing it to stand for forty-eight hours. The shortening was then agitated gently and then packaged.

The shortening prepared by the above process met the rigid requirements of a true heat-stable shortening.

EXAMPLE IV

A 1,000 gram sample of deodorized oil composed of 91.5% hardened cottonseed oil (103 I.V.), 2.8% hardened soybean oil (5.0 I.V.), and 5.7% superglycerinated hardened peanut oil (30 I.V.) was used in this example.

The analysis of this composition was as follows:

Iodine value _____ 96.3
Dilatometric solids at:
- 10.0° C _____ 7.0
- 21.1° C _____ 5.7
- 26.7° C _____ 4.8
- 33.3° C _____ 3.2
- 40.0° C _____ 0.4

This oil was heated to 77° C. to melt all crystals and crystal nuclei. Agitation was applied as in Example II. The oil was then cooled to 32.5° C. in a 32.2° C. water bath in fifteen to twenty minutes, and maintained at this temperature for thirty minutes to form small beta-prime crystals. The mixture was then heated in ten to twenty minutes to 45° C. in a 45° C. water bath and maintained at this temperature for thirty minutes to form beta crystals of the same size and number as the beta-prime crystals. The mixture was then slowly cooled to 21.1° C. over a two hour period to recrystallize any melted crystals in the established pattern. Agitation was then stopped.

The shortening prepared according to the above process met the rigid requirements of a true heat-stable shortening.

EXAMPLE V

A 1,000 gram sample of deodorized oil composed of 91.5% hardened cottonseed oil (103 I.V.), 2.8% hardened peanut oil (5–10 I.V.) and 5.7% supreglycerinated hardened peanut oil (30 I.V.).

The analysis of this composition was as follows:

Iodine value _____ 96.3
Dilatometric solids at:
- 10.0° C _____ 6.7
- 21.1° C _____ 5.8
- 26.7° C _____ 5.0
- 33.3° C _____ 3.3
- 40.0° C _____ 1.1

This sample was processed identically to Example IV and the shortening produced met the rigid requirements of a true heat-stable shortening.

EXAMPLE VI

A 1,000 gram sample of deodorized oil composed of 91.5% hardened soybean oil (114 I.V.), 2.8% hardened soybean oil (1–2 I.V.), and 5.7% superglycerinated hardened peanut oil (30 I.V.).

The analysis of this composition was as follows:

| | |
|---|---|
| Iodine value | 98.6 |
| Dilatometric solids at: | |
| 10.0° C | 7.9 |
| 21.1° C | 7.0 |
| 26.7° C | 6.0 |
| 33.3° C | 4.8 |
| 40.0° C | 2.8 |

This sample was also processed identically to Example IV and the shortening produced met the requirements of a true heat-stable shortening.

EXAMPLE VII

A 1,000 gram sample of deodorized oil composed of 92.4% winterized cottonseed oil (salad oil), 2.8% hardened soybean oil (1.2 I.V.), and 4.8% superglycerinated hardened peanut oil (30 I.V.).

The analysis of this composition was as follows:

| | |
|---|---|
| Iodine value | 101.2 |
| Dilatometric solids at: | |
| 10.0° C | 6.0 |
| 21.1° C | 5.5 |
| 26.7° C | 5.2 |
| 33.3° C | 4.1 |
| 40.0° C | 2.9 |

This sample was again processed identically to Example IV and a shortening was produced meeting the rigid requirements of a true heat-stable shortening.

EXAMPLE VIII

A 1,000 gram sample of deodorized oil composed of 92.4% winterized cottonseed oil (salad oil), 2.8% hardened soybean oil (1–2 I.V.), and 4.8% superglycerinated hardened peanut oil (4.7 I.V.).

The analysis of this composition was as follows:

| | |
|---|---|
| Iodine value | 100.3 |
| Dilatometric solids at: | |
| 10.0° C | 7.2 |
| 21.1° C | 6.8 |
| 26.7° C | 6.4 |
| 33.3° C | 5.3 |
| 40.0° C | 3.2 |

This sample was processed identically to Example IV and a shortening was produced meeting the rigid requirements of a true heat-stable shortening.

While this invention for the purpose of disclosure has been directed to the preparation of liquid shortenings having desirable temperature-stable properties, the principles thereof may be applied to other feedstocks and the preparation of other emulsions in which stability is desired and the flavoring and coloring composition may be applied to other liquid and plastic shortenings. In connection with the liquid shortening aspects of this invention, the conditions may be varied and determined by pilot tests so that small beta-prime crystals are formed and serve as nuclei from which stable beta crystals are formed of substantially the same size and number of the beta-prime crystals thereby providing a heat-stable emulsion.

The present invention, therefore, is well suited to carry out the objects and attain the ends and advantages mentioned as well as others inherent therein.

Various changes in details and uses of the present invention will suggest themselves to those skilled in the art which are encompassed within the spirit of the invention and the scope of the appended claims.

What is claimed is:

1. In a process of preparing a liquid shortening comprised of a stable suspension of discrete particles of solid fats in oil in a temperature range of from about 60° F. to about 110° F., the improvement comprising the first step of melting all the solid fats and crystal nuclei contained in a base oil, said solid fats and crystal nuclei being in an amount sufficient for preparing said liquid shortening, the second step of cooling the base oil to a temperature slightly above the alpha melting point of the fats and maintaining the liquid shortening at said temperature for a period of time sufficient to form all crystals into relatively small beta prime crystals and beta crystals, the third step of heating the base oil to a temperature slightly above the beta prime melting point of said beta prime crystals and maintaining the base oil at said last-mentioned temperature for a period of time sufficient to convert substantially all said beta prime crystals to beta crystals of substantially the same size as said beta prime crystals, and agitating said base oil during said second and third steps at a rate sufficient to form said crystals as aforesaid.

2. In a process of preparing a liquid shortening comprised of a stable suspension of discrete particles of solid fats in oil in a temperature range of from about 60° F. to about 110° F., the improvement comprising the first step of melting all the solid fats and crystal nuclei contained in a base oil, said solid fats and crystal nuclei being in an amount sufficient for preparing said liquid shortening, the second step of cooling the base oil to a temperature slightly above the alpha melting point of the fats and maintaining the oil at said temperature for a period of time sufficient to form substantially all crystals into relatively small beta prime crystals and beta crystals, the third step of heating the base oil to a temperature slightly above the beta prime melting point of said beta prime crystals and maintaining the liquid shortening at said last-mentioned temperature for a period of time sufficient to form beta crystals of substantially the same size as said beta prime crystals, the fourth step of recrystallizing normally solid fats melted during said third step in the same form and pattern established by slowly cooling said base oil, and agitating said base oil during said second, third and fourth steps at a rate sufficient to form said crystals as aforesaid.

3. In a process of preparing a liquid shortening comprised of a heat stable suspension of discrete particles of solid fats in oil in which all solid fats and crystal nuclei in a base oil, said solid fats and crystal nuclei being in an amount sufficient for preparing said liquid shortening have been melted, the improvement comprising cooling the base oil to slightly above the alpha melting point of said fats while agitating at a rate sufficient to form small beta prime crystals and beta crystals, maintaining said base oil at said temperature while continuing said agitation for a period of time sufficient to form substantially all crystals in said small betal prime and beta crystalline form, heating said base oil to a temperature slightly in excess of the melting point of said beta prime crystals while continuing said agitation at a rate sufficient to form beta crystals from and of the same size as said beta prime crystals, and maintaining said base oil at said last-mentioned temperature while continuing said agitation for a period of time sufficient to convert substantially all said beta prime crystals to said beta crystals.

4. In a process of preparing a liquid shortening comprised of a heat stable suspension of discrete particles of solid fats in oil in which all solid fats and crystal nuclei in a base oil suitable for preparing said liquid shortening have been melted, the improvement comprising cooling the base oil to slightly above the alpha melting point of said fats while agitating at a rate sufficient to form small beta prime crystals and beta crystals, maintaining said base oil at said temperature while continuing said agitation for a period of time sufficient to form substantially all crystals in said small beta prime and beta crystalline form, heating said base oil to a temperature slightly in excess of the melting point of said beta prime crystals while continuing said agitation at a rate sufficient to form beta crystals from and of the same size as said beta prime crystals, maintaining said base oil at said last-mentioned temperature while continuing said agitation for a period of time sufficient to convert substantially all said beta prime crystals to said beta crystals, and cooling the base oil while continuing said agitation at a rate sufficient to recrystallize all normally solid fats melted in said last-mentioned step in the same crystalline pattern and form established.

5. The process of claim 4 where the base oil comprises a normally-liquid base oil selected from the group consisting of cottonseed oil and soybean oil; hardstock selected from the group consisting of soybean oil and peanut oil; and super-glycerinated fats selected from the group consisting of peanut oil, cottonseed oil, mustard seed oil, rapeseed oil, cottonseed salad oil stearine, a mixture of cottonseed oil and peanut oil, and mixtures of soybean oil and cottonseed oil.

6. In a process of preparing a liquid shortening comprised of a stable suspension of discrete particles of solid fats in oil in a temperature range of from about 60° F. to about 110° F., said shortening remaining fluid throughout this range, the steps of heating a base oil suitable for preparing said liquid shortening to a temperature sufficient to melt all fats and crystal nuclei contained therein, cooling the liquid shortening in from about 10 minutes to about 45 minutes to a temperature of about 1.5° C. to about 4.0° C. above the alpha melting point of said fats while agitating the base oil, maintaining the base oil at said last-mentioned temperature while continuing said agitation for a period of about 30 minutes to form substantially only small discrete beta prime crystals from said fats and crystal nuclei, heating said base oil while continuing said agitation in from about 10 minutes to about 20 minutes to a temperature from about 3.5° C. to 5.5° C. above the melting point of said beta-prime crystals, and maintaining said base oil while continuing said agitation at said last-mentioned temperature for a period of about 30 minutes.

7. In a process of preparing a liquid shortening comprised of a stable suspension of discrete particles of solid fats in oil at a temperature range of from about 60° F. to about 110° F., said shortening remaining fluid throughout this range, the steps of heating a base oil suitable for preparing said liquid shortening to a temperature sufficient to melt all fats and crystal nuclei contained therein, cooling the base oil in from about 10 minutes to about 45 minutes to a temperature of from about 1.5° C. to about 4.0° C. above the alpha melting point of the fats while agitating the base oil, maintaining the base oil at the last-mentioned temperature while continuing said agitation for a period of about 30 minutes to form small discrete beta-prime crystals, heating said base oil while continuing said agitation in from about 10 minutes to about 20 minutes to a temperature of from about 3.5° C. to about 5.5° C. above the melting point of said beta-prime crystals, maintaining said base oil while continuing said agitation at said last-mentioned temperature for a period of about 30 minutes, and slowly cooling the base oil while continuing said agitation to a temperature of about 21° C. for a period of about 1½ to about 3 hours and then discontinuing said agitation.

8. The process of claim 7 where the base oil comprises a normally-liquid base oil selected from the group consisting of cottonseed oil and soybean oil; hardstock selected from the group consisting of soybean oil and peanut oil; and super-glycerinated fats selected from the group consisting of peanut oil, cottonseed oil, mustard seed oil, rapeseed oil, cottonseed salad oil stearine, mixtures of cottonseed oil and peanut oil, and mixtures of soybean oil and cottonseed oil.

References Cited in the file of this patent

UNITED STATES PATENTS

| Number | Name | Date |
|---|---|---|
| 2,521,219 | Holmon et al. | Sept. 5, 1950 |
| 2,521,242 | Mitchell | Sept. 5, 1950 |
| 2,521,243 | Mitchell | Sept. 5, 1950 |
| 2,815,285 | Holman et al. | Dec. 3, 1957 |
| 2,815,286 | Andre et al. | Dec. 3, 1957 |

OTHER REFERENCES

Schwitzer: "Margarine and Other Food Fats," Interscience Publishers, Inc., New York (1956), pp. 118, 262 and 264.

Jacobs: "Synthetic Food Adjuncts," D. Van Nostrand Company, Inc., New York (1947), page 101.